United States Patent Office
3,211,732
Patented Oct. 12, 1965

3,211,732
PYRAZOLO[3:4-d]PYRIMIDINES
Paul Schmidt, Therwil, and Kurt Eichenberger and Max Wilhelm, Basel, Switzerland, assignors to Ciba Corporation, New York, N.Y., a corporation of Delaware
No Drawing. Filed Apr. 15, 1964, Ser. No. 360,070
Claims priority, application Switzerland, May 11, 1960, 5,404/60; Apr. 4, 1961, 3,932/61
20 Claims. (Cl. 260—256.4)

This is a continuation-in-part of our application Serial No. 107,916, filed May 5, 1961 (now abandoned).

The present invention provides new pyrazolo[3:4-d]pyrimidines. Especially it concerns pyrazolo[3:4-d]pyrimidines of the formula

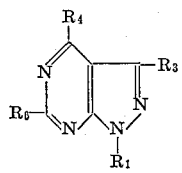

in which $R_1$ represents a hydrogen atom, a lower alkyl radical which is unsubstituted or substituted by a hydroxy group or a lower alkoxy group, or a cyclopentyl or cyclohexyl radical or a phenyl or phenyl-lower alkyl radical, $R_3$ represents a hydrogen atom or a lower alkyl radical, $R_4$ represents an amino group, a mono-lower alkylamino group, a di-lower alkylamino group, a lower akyleneimino group, such as piperidino or pyrrolidino or hexamethyleneimino, a morpholino group or a piperazino group, such as the piperazino group or an N-lower alkylpiperazino group, for example, the N-methylpiperazino group, or a hydrazino group and $R_6$ stands for a phenyl-lower alkyl radical, and their salts.

A further embodiment of the present invention are pyrazolo[3:4-d]pyrimidines of the formula shown above in which $R_1$, $R_3$ and $R_4$ have the above meanings and $R_6$ stands for a phenyl radical, and their salts.

Lower alkyl radicals are, for example, methyl, ethyl, propyl or isopropyl groups, straight or branched butyl, pentyl, hexyl or heptyl groups which may be bound in any position. Lower alkoxy groups are especially methoxy, ethoxy, propoxy, isopropoxy, butoxy, tertiary butoxy or pentyloxy groups. Halogen atoms are for example chlorine, fluorine or bromine atoms.

The above mentioned phenyl and phenyl-lower alkyl radicals are unsubstituted or substituted. As substituents of the aromatic nuclei there come into consideration for example, lower alkyl groups, such as those mentioned above, hydroxy groups, lower alkoxy groups, such as those mentioned above, mercapto groups, lower alkylmercapto groups, amino groups, mono-lower alkylamino groups, di-lower alkylamino groups, halogen atoms, for example those mentioned above, trifluoromethyl or nitro groups. Especially preferred substituents of the aromatic nuclei of the phenyl or phenyl-lower alkyl radicals are lower alkyl, lower alkoxy or trifluoromethyl groups or halogen atoms.

As mono-lower alkylamino groups there may be mentioned for example methylamino, ethylamino, propylamino, butylamino or pentylamino groups. Di-lower alkylamino groups are especially dimethylamino, diethylamino, dipropylamino, methyl-propyl-amino or ethyl-butyl-amino groups. Lower alkylmercapto groups are, e.g., methylmercapto, ethylmercapto or butylmercapto groups.

The new compounds possess valuable pharmacological properties. More especially they are active as coronary dilators, and are thus useful as medicaments more especially for treating circulatory disturbances in the myocardium. They are also useful as intermediates for the manufacture of such medicaments.

Special mention deserve the compounds of the formula

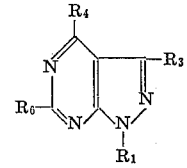

in which $R_1$ stands for a hydrogen atom, a lower alkoxy-lower alkyl radical or a hydroxy-lower alkyl radical, a cyclopentyl or cyclohexyl radical or a phenyl or phenyl-lower alkyl radical which may be substituted as described above, $R_3$ and $R_4$ have the meanings given above and $R_6$ stands for a phenyl radical which may be substituted as described above.

Especially valuable are the compounds of the formula

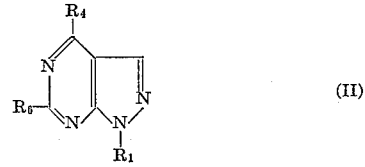
(II)

in which $R_1$ stands for a hydrogen atom, a lower alkyl radical, a cyclopentyl radical, a cyclohexyl radical or a phenyl radical or, in the second place, for a phenyl-lower alkyl radical, $R_4$ has the meanings given above, and $R_6$ stands for a phenyl-lower alkyl radical and the compounds of the Formula II in which $R_1$ represents a hydrogen atom, a cyclopentyl radical, a cyclohexyl radical or a phenyl radical or, in the second place, a phenyl-lower alkyl radical or, in the third place, a lower alkyl radical, $R_4$ has the meanings given above and $R_6$ stands for a phenyl radical.

The most valuable compounds are those of Formula II in which $R_1$ stands for lower alkyl or phenyl, $R_4$ represents a di-lower alkylamino group, a hydrazino group, a lower alkyleneimino, such as piperidino or pyrrolidino group, or an N-lower alkyl-piperazino, such as N-methyl-piperazino group, and $R_6$ stands for phenyl-lower alkyl, such as benzyl, and the compounds of the Formula II in which $R_1$ stands for lower alkyl, $R_6$ for phenyl and $R_4$ for di-lower alkylamino or advantageously for N-lower alkyl-piperazino or lower alkyleneimino, such as pyrrolidino or piperidino, and especially the 1-phenyl-4-piperidino-6-benzyl-pyrazolo[3:4-d]pyrimidine and the 1-isopropyl-4-dimethylamino-6-benzyl - pyrazolo[3:4-d]pyrimidine.

The new compounds may be prepared according to known methods. Thus, for example, they are obtained, when a compound of the formula

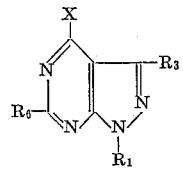

in which X stands for a halogen atom such as chlorine or bromine, or a free or substituted mercapto group, such as an alkylmercapto or benzylmercapto group, and $R_1$, $R_3$ and $R_6$ have the meanings given above, is treated with ammonia or with an amine, preferably at a raised temperature, in the absence or presence of a solvent and under atmospheric or superatmospheric pressure.

The 4 - halogen - pyrazolo[3:4-d]pyrimidines used as starting materials in the present process are new and possess valuable properties, and they are also included in the invention.

The starting materials are obtained by exchanging in a 1 - $R_1$-3-$R_3$-6-$R_6$-4-hydroxy-pyrazolo[3:4-d]pyrimidine the free hydroxyl group for a halogen atom, such as chlorine or bromine, with the aid of a conventional halogenating agent, such as phosphorus oxychloride or pentachloride, or by converting the free hydroxyl group into a mercapto group by treatment with a sulfurizing agent such as phosphorus pentasulfide.

In a 4-halogen-compound so obtained the halogen atom can be exchanged in the conventional manner for a free or substituted mercapto group, for example, by treatment with thiourea, a metal salt of hydrogen sulfide or a mercaptan. Substituents may be introduced into free mercapto groups in the conventional manner, for example, by reaction with a reactive ester of an alcohol. For this purpose these are suitable as reactive esters those of strong inorganic or organic acids, for example, hydrohalic acids or sulfuric acid, or organic sulfonic acids, for example, aryl-sulfonic acids. As alcohols there may be mentioned above all lower alkanols. There reactions are carried out in the conventional manner.

The 6-phenyl-lower alkyl-4-hydroxy compounds used as starting materials for the aforesaid reaction are described in our copending patent application Ser. No. 107,906, filed May 5, 1961.

The 4-hydroxy compounds may be obtained by reacting a 2-$R_1$-3-amino-5-$R_3$-pyrazole-4-carboxylic acid ester with a nitrile of the formula $R_6$—CN in the presence of sodium as condensing agent.

The afore-mentioned reactions are performed in the usual manner in the presence or absence of diluents, condensing agents and/or catalysts at room temperature or with cooling or heating, if desired under superatmospheric pressure and/or under an inert gas.

Depending on the reaction conditions and starting materials employed, the new 4-$R_4$-pyrazolo[3:4-d]pyrimidines are obtained in the free form or in the form of their salts which are also included within the scope of the invention. The salts of the end products may be converted in a manner known per se, for example, with an alkali or an ion exchange resin, into the free bases. From the latter, salts may be obtained by reaction with an organic or inorganic acid, particularly with an acid which is suitable for the formation of a therapeutically acceptable salt. Examples of such acids are: hydrohalic acids, sulfuric acids, phosphoric acids, nitric acid, perchloric acid, aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic, pyruvic acid; phenyl-acetic, benzoic, p-aminobenzoic, anthranilic, p-hydroxybenzoic, salicylic or p-amino-salicylic acid, emonic acid, methanesulfonic, ethanesulfonic acid; halogenbenzenesulfonic, toluenesulfonic, naphthalenesulfonic acids or sulfanilic acid; methionine, tryptophan, lysine or arginine.

The above or other salts of the new compounds, such, for example, as the picrates, may also be used for the purification of the resulting bases by converting the bases into the salts, separating the latter and liberating the bases from the salts. In view of the close relation between a base in the free form and in the form of a salt thereof, whenever a free base is referred to in this context, a corresponding salt is also intended, provided such is possible or appropriate under the circumstances.

The invention includes also any modification of the present process in which an intermediate obtainable at any stage of the process is used a starting material and any remaining step or steps is/are carried out, or the process is discontinued at any stage thereof, or in which the starting materials are formed under the reaction conditions, or in which the reactants are alternatively used in the form of their salts.

The reactions of the invention are preferably performed with the use of starting materials that yield the above-mentioned preferred compounds.

The starting materials are known or can be prepared by as such known methods.

The new compounds may be used, for example, in the form of pharmaceutical preparations containing said compounds or their salts in admixture or conjunction with an organic or inorganic, solid or liquid pharmaceutical excipient suitable for enteral or parenteral administration. Suitable excipients are substances that do not react with the new compounds, for example, water, gelatine, lactose, starches, stearyl alcohol, magnesium stearate, talcum, vegetable oils, benzyl alcohols, gums, propylene glycol, polyalkylene glycols, white petroleum jelly, cholesterol or other known medicinal excipients. The pharmaceutical preparations may be, for example, tablets, dragees or capsules, or in liquid form solutions, suspensions or emulsions. They may be sterilized and/or may contain assistants such as preserving, stabilizing, wetting or emulsifying agents, solution promoters, salts for regulating the osmotic pressure or buffers. They may also contain other therapeutically useful substances. The pharmaceutical preparations are formulated by the usual methods.

They contain, for example, 5–50 mg., and preferably 10 mg., of the active substance per dosage unit and about 1–70%, and preferably 5–50%, of active substance.

The new compounds may also be used in the form of animal feedingstuffs or of additives to feedingstuffs, with the use, for example, of the usual extenders and diluents or feedingstuffs respectively.

The following examples illustrate the invention:

*Example 1*

A mixture of 10 grams of 1-isopropyl-4-methyl-mercapto - 6 - benzyl-pyrazolo[3:4-d]pyrimidine and 60 cc. of liquid dimethylamine is heated in a closed tube for 6 hours at 90 to 100° C. The excess of dimethylamine is then evaporated, and the residue is recrystallized from petroleum ether, to yield 1-isopropyl-4-dimethylamino-6-benzyl-pyrazolo[3:4-d]pyrimidine of the formula

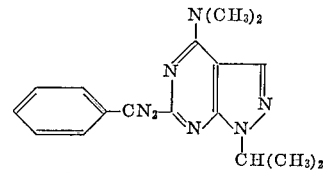

in the form of colorless crystals melting at 117 to 118° C.

The starting material is obtained in the following manner:

2.3 grams of sodium are finely distributed in 50 cc. of benzylcyanide and 9.9 grams of 2-isopropyl-3-amino-4-carbethoxypyrazole are added. The mixture is heated for 4 hours at 110 to 120° C. while being stirred, allowed to cool, treated with 100 cc. of alcohol and evaporated to dryness under vacuum. The residue is taken up in 150 cc. of 2 N-sodium hydroxide solution, the alkaline solution is freed from undissolved matter by being extracted with chloroform and then adjusted to pH 5–6 with 6 N-hydrochloric acid, whereupon a solid product precipitates which is recrystallized from a small amount of alcohol, to yield the 1-isopropyl-4-hydroxy-6-benzyl - pyrazolo-[3:4-d]pyrimidine of the formula

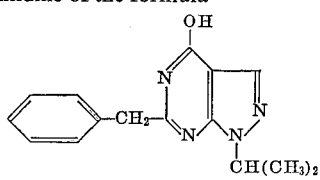

in colorless crystals melting at 165 to 166° C.

A solution of 13 grams of 1-isopropyl-4-hydroxy-6-benzyl-pyrazolo[3:4-d]pyrimidine in 100 cc. of pyridine is treated with 15 grams of phosphorous pentasulfide, and the mixture is heated at the boil for 8 hours. The reaction solution is then poured into 2 liters of ice water, left to itself overnight, and the yellow precipitate is then suctioned off. Recrystallized from a small amount of ethanol yields the 1-isopropyl-4-mercapto-6-benzyl-pyrazolo-[3:4-d]pyrimidine of the formula

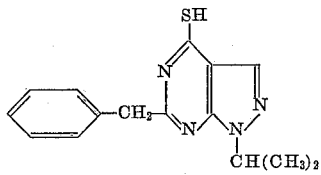

in yellow crystals melting at 145 to 147° C.

A solution of 14 grams of 1-isopropyl-4-mercapto-6-benzyl-pyrazolo[3:4-d]pyrimidine in 60 cc. of 2 N-sodium hydroxide solution is treated with 13 grams of dimethyl-sulfate, and the mixture is stirred for 2 hours at room temperature. The alkaline solution is then extracted with ether and the ether residue is recrystallized from petroleum ether, to yield 1-isopropyl-4-methylmercapto-6-benzyl-pyrazolo[3:4-d]pyrimidine in crystals melting at 84 to 85° C.

*Example 2*

A solution of 16 grams of 1-isopropyl-4-methyl-mercapto-6-benzyl-pyrazolo[3:4-d]pyrimidine and 30 cc. of hydrazine hydrate in 150 cc. of ethanol is heated for 4 hours at the boil, then concentrated under vacuum to 50 cc.; the precipitate is suctioned off and crystallized from ethanol, to yield the 1-isopropyl-4-hydrazino-6-benzyl-pyrazolo[3:4-d]pyrimidine of the formula

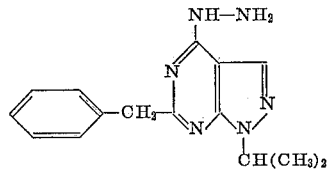

in colorless crystals melting at 136 to 137° C.

*Example 3*

7 grams of 1-phenyl-4-chloro-6-benzyl-pyrazolo-[3:4-d]pyrimidine are mixed with a solution of 25 grams of dimethylamine in 50 cc. of ethanol and the whole is heated in an autoclave for 7 hours at 100° C., then allowed to cool; the precipitate is suctioned off and recrystallized from ethanol, to yield the 1-phenyl-4-dimethylamino-6-benzyl-pyrazolo[3:4-d]pyrimidine of the formula

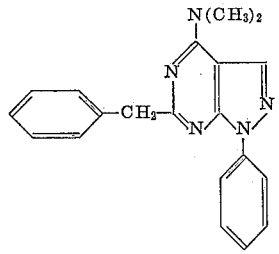

in crystals melting at 121 to 122° C.

1 - phenyl-4-chloro-6-benzyl - pyrazolo[3:4-d]pyrimidine used as starting material is manufactured in the following manner:

2.3 grams of sodium in small pieces are added to a mixture of 12 grams of 2-phenyl-3-amino-4-carbethoxy-pyrazole and 50 grams of benzylcyanide, and the whole is heated with stirring for 4 hours at 140° C. and then allowed to cool. The reaction mixture is treated with 100 cc. of alcohol and 2 N-hydrochloric acid is added to establish a pH value of 5-6. The resulting precipitate is recrystalized from chloroform+petrolum ether to yield the 1 - phenyl - 4 - hydroxy-6-benzyl-pyrazolo[3:4-d]pyrimidine of the formula

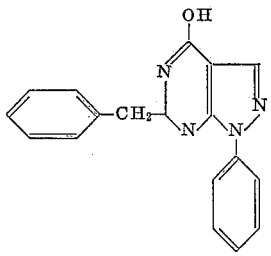

in colorless crystals melting at 264 to 265° C.

A mixture of 15 grams of 1-phenyl-4-hydroxy-6-benzyl-pyrazolo(3:4-d)pyrimidine and 100 cc. of phosphorous oxychloride is refluxed for 6 hours. The excess phosphorous oxychloride is evaporated and the residue is dissolved in chloroform and successively extracted with 100 cc. of water and 100 cc. of sodium bicarbonate solution. The chloroform solution is dried and evaporated and yields a solid residue which is recrystallized from chloroform+petroleum ether. The resulting 1-phenyl-4-chloro-6-benzy-pyrazolo[3:4-d]pyrimidine forms yellowish crystals melting at 90 to 91° C.

*Example 4*

A mixture of 5 grams of 1-phenyl-4-chloro-6-benzyl-pyrazolo[3:4-d]pyrimidine, 10 grams of piperidine and 50 cc. of ethanol is boiled for 7 hours and then cooled; the precipitate is suctioned off and recrystallized from ethanol, to yield the 1-phenyl-4-piperidino-6-benzyl-pyrazolo[3:4-d)pyrimidine of the formula

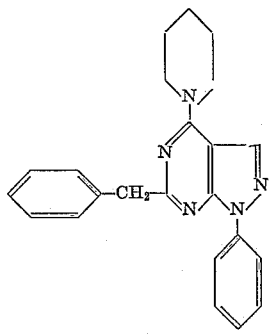

in crystals melting at 116 to 118° C.

*Example 5*

A mixture of 7 grams of 1-phenyl-4-chloro-6-benzyl-pyrazolo[3:4-d]pyrimidine, 10 grams of N-methyl-piperazine and 5 cc. of ethanol is refluxed for 7 hours. On cooling, the 1-phenyl-4 - N - methyl-piperazino-6-benzyl-pyrazolo[3:4-d]pyrimidine of the formula

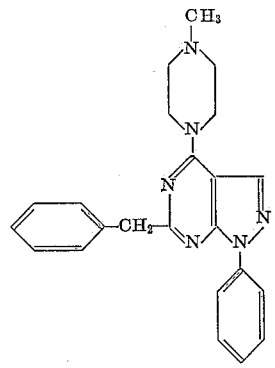

separates out; after recrystallization from ethanol it melts at 122° C.

*Example 6*

A mixture of 7 grams of 1-isopropyl-4-chloro-6-phenyl-pyrazolo[3:4-d]pyrimidine and 100 cc. of piperidine is heated in a closed tube for 5 hours at 100° C. The reaction mixture is flushed out with alcohol and the insoluble matter is filtered off. The filtrate is evaporated in vacuum, and the residue is treated with sodium hydroxide solution and then extracted with ether. The ethereal solution is evaporated and the residue is recrystallized from petroleum ether, to yield the 1-isopropyl-4-piperidino-6-phenyl-pyrazolo[3:4-d]pyrimidine of the formula

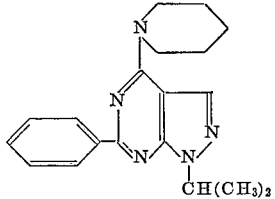

melting at 127.5 to 128.5 ° C.

1 - isopropyl - 4 - chloro 6-phenyl - pyrazolo[3:4-d]-pyrimidine used as starting material is prepared in the following manner:

16.8 grams of 2-isopropyl-3-aminopyrazole-4-carboxylic acid amide are ground with 4.2 grams of benzoic acid amide and the mixture is heated for 10 hours at 270° C. The crystalline reaction product is treated with 2 N sodium hydroxide solution, the insoluble matter is filtered off, and the filtrate is adjusted with 5 N hydrochloric acid to pH 6, whereupon the 1-isopropyl-4-hydroxy-6-phenyl-pyrazolo[3:4-d]pyrimidine of the formula

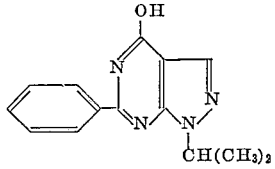

separates out; after recrystallization from alcohol it melts at 256 to 258° C.

A mixture of 18.2 grams of 1-isopropyl-4-hydroxy-6-phenyl-pyrazolo[3:4-d]pyrimidine and 100 cc. of phosphorus oxychloride is refluxed for 8 hours. The reaction solution is evaporated to dryness at 60° C. and the residue is treated with ice and 2 N sodium hydroxide solution and extracted with ether. The ethereal solution is evaporated and the residue is recrystallized from the ether+petroleum ether, to yield the 1-isopropyl-4-chloro-6-phenyl-pyrazolo[3:4-d]pyrimidine of the formula

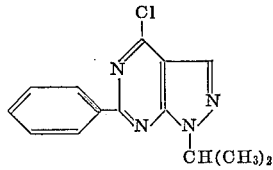

melting at 106 to 107° C.

Example 7

A mixture of 7 grams of 1-isopropyl-4-chloro-6-phenyl-pyrazolo[3:4-d]pyrimidine and 100 cc. of diethylamine is heated in a closed tube for 5 hours at 90 to 100° C., then treated with benzene and the insoluble matter is filtered off. The filtrate is treated with 2 N sodium hydroxide solution and extracted with ether. The ethereal solution is evaporated and the residue is recrystallized from petroleum ether, to yield the 1-isopropyl-4-diethylamino-6-phenyl-pyrazolo[3:4-d]pyrimidine of the formula

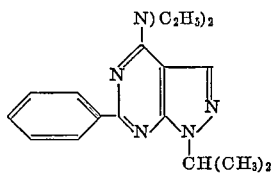

melting at 104 to 105° C.

In an analogous manner to that described above from the corresponding 4 - chloro - pyrazolo [3:4-d]pyrimidine and the corresponding amine there may be prepared: 1-(γ - hydroxypropyl)-4-amino-6-(meta-nitrobenzyl)-pyrazolo-[3:4 - d]pyrimidine, 1-(β-methoxyethyl) - 4-methyl-amino-6-(ortho - methoxybenzyl)-pyrazolo[3:4-d]pyrimidine, 1-cyclopentyl - 3 - methyl - 4 - pyrrolidino-6-(para-chlorobenzyl)-pyrazolo[3:4-d]pyrimidine, 1 - cyclohexyl-4 - morpholino-6-(para-methylbenzyl) - pyrazolo[3:4 -d] pyrimidine, 1-(para-hydroxybenzyl) - 4 - hexamethylene-imino-6-(para-methylmercaptobenzyl) -pyrazolo[3:4 - d] pyrimidine, 1 - (meta - methoxyphenyl) - 4 - piperazino-6-(meta - trifluoromethylphenyl) - pyrazolo[3:4 - d]pyrimidine, 1-(para-bromobenzyl) - 4 - dimethylamino-6-(para-aminophenyl)-pyrazolo[3:4-d]pyrimidine and 1 - (ortho-tolyl) - 4 - diethylamino - 6 - (meta - methoxyphenyl)-pyrazolo[3:4-d]pyrimidine.

Example 8

1-isopropyl - 4 - dimethylamino - 6 - benzyl-pyrazolo-[3:4-d]pyrimidine is made up in the conventional manner into tablets of the following composition:

|  | mg. |
|---|---|
| 1 - isopropyl - 4 - dimethylamino-6-benzyl - pyrazolo [3:4-d]pyrimidine | 10 |
| Lactose | 35 |
| Non-swelling starch | 20 |
| Wheat starch | 10 |
| Aerosil | 10 |
| Arrowroot | 12 |
| Magnesium stearate | 0.5 |
| Talcum | 6 |

What is claimed is:

1. A member selected from the group of pyrazolo-pyrimidines of the formula

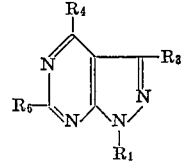

and physiologically tolerable acid addition salts thereof in which formula $R_1$ stands for a member selected from the group consisting of hydrogen, lower alkyl, hydroxy-lower alkyl, lower alkoxy-lower alkyl, cyclopentyl, cyclohexyl, phenyl and phenyl-lower alkyl and said phenyl and phenyl-lower alkyl substituted by a member selected from the group consisting of lower alkyl, hydroxy, lower alkoxy, mercapto, lower alkylmercapto, amino, lower alkylamino, di-lower alkylamino, halogen, trifluoromethyl and nitro, $R_3$ represents a member selected from the group consisting of hydrogen and lower alkyl, $R_4$ a member selected from the group consisting of amino, mono-lower alkylamino, di-lower alkylamino, lower alkyleneimino having 5–7 ring-carbon atoms, morpholino, piperazino, N-lower alkyl-piperazino and hydrazino and $R_6$ represents a member selected from the group consisting of phenyl-lower alkyl, lower alkylphenyl-lower alkyl, hydroxy-phenyl-lower alkyl, lower alkoxy-phenyl-lower alkyl, mercaptophenyl-lower alkyl, lower alkylmercapto phenyl-lower alkyl, aminophenyl-lower alkyl, lower alkylamino-phenyl-lower alkyl, di-lower alkylaminophenyl-lower alkyl, halogenophenyl-lower alkyl, trifluoromethyl-phenyl-lower alkyl and nitrophenyl-lower alkyl.

2. A member selected from the group of pyrazolo-pyrimidines of the formula

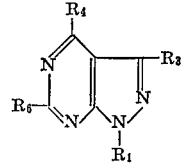

and physiologically tolerable acid addition salts thereof in which formula $R_1$ stands for a member selected from the group consisting of hydrogen, lower alkyl, hydroxy-lower alkyl, lower alkoxy-lower alkyl, cyclopentyl, cyclohexyl, phenyl and phenyl-lower alkyl and said phenyl and phenyl-lower alkyl substituted by a member selected from the group consisting of lower alkyl, hydroxy, lower alkoxy, mercapto, lower alkylmercapto, amino, lower alkylamino, di-lower alkylamino, halogen, trifluoromethyl and nitro, $R_3$ represents a member selected from the group consisting of hydrogen and lower alkyl, $R_4$ a member selected from the group consisting of amino, mono-lower alkylamino, di-lower alkylamino, lower alkyleneimino having 5–7 ring-carbon atoms, morpholino, piperazino, N-lower alkylpiperazino and hydrazino and $R_6$ represents a member selected from the group consisting of phenyl, lower alkylphenyl, hydroxyphenyl, lower alkoxyphenyl, mercaptophenyl, lower alkylmercaptophenyl, aminophenyl, lower alkylaminophenyl, di-lower-alkylaminophenyl, halogenophenyl, trifluoromethylphenyl and nitrophenyl.

3. A pyrazolo-pyrimidine of the formula

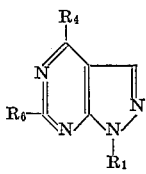

wherein $R_1$ stands for lower alkyl, $R_4$ for di-lower alkyl amino and $R_6$ for phenyl.

4. A pyrazolo-pyrimidine of the formula

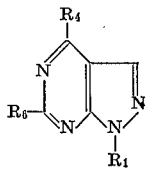

wherein $R_1$ stands for lower alkyl, $R_4$ for di-lower-alkyl-amino and $R_6$ for phenyl-lower-alkyl.

5. A pyrozolo-pyrimidine of the formula

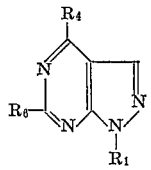

wherein $R_1$ stands for lower-alkyl, $R_4$ for hydrazino and $R_6$ for phenyl-lower-alkyl.

6. A pyrazolo-pyrimidine of the formula

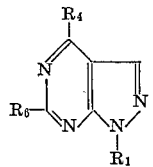

wherein $R_1$ stands for phenyl, $R_4$ for di-lower-alkyl amino and $R_6$ for phenyl-lower alkyl.

7. A pyrazolo-pyrimidine of the formula

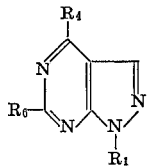

wherein $R_1$ stands for phenyl, $R_4$ for N-lower alkyl-piperazino and $R_6$ for phenyl-lower alkyl.

8. A pyrazolo-pyrimidine of the formula

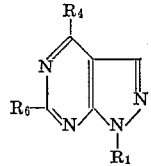

wherein $R_1$ stands for lower alkyl, $R_4$ for N-lower alkyl-piperazino and $R_6$ for phenyl.

9. A pyrazolo-pyrimidine of the formula

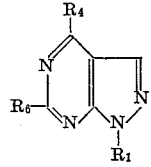

wherein $R_1$ stands for lower alkyl, $R_4$ for N-lower alkyl-piperazino and $R_6$ for phenyl-lower-alkyl.

10. A pyrazolo[3:4-d]pyrimidine of the formula

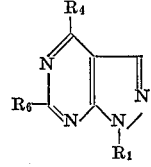

in which $R_1$ stands for lower alkyl, $R_4$ for lower alkyleneimino having 5–7 ring-carbon atoms and $R_6$ for phenyl-lower alkyl.

11. 1-isopropyl-4-dimethylamino - 6-benzyl - pyrazolo-[3:4-d]pyrimidine.

12. 1 - isopropyl - 4 - piperidino - 6 - phenyl-pyrazolo [3:4-d]pyrimidine.

13. 1-isopropyl - 4 - hydrazino - 6 - benzyl-pyrazolo [3:4-d]pyrimidine.

14. 1 - phenyl - 4 - dimethylamino-6-benzyl-pyrazolo [3:4-d]pyrimidine.

15. 1 - phenyl - 4 - piperidino - 6 - benzyl-pyrazolo [3:4-d]pyrimidine.

16. 1-phenyl-4-N - methylpiperazino-6-benzyl-pyrazolo [3:4-d]pyrimidine.

17. 1 - isopropyl - 4 - diethylamino - 6 - phenyl-pyrazolo-[3:4-d]pyrimidine.

18. A physiologically tolerable acid addition salt of a compound claimed in claim 3.

19. A physiologically tolerable acid addition salt of a compound claimed in claim 9.

20. A 1-$R_1$-3-$R_3$-4-halogen-6-$R_6$-pyrazolo[3:4-d]pyrimidine in which $R_1$ stands for a member selected from the group consisting of hydrogen, lower alkyl, hydroxy-lower alkyl, lower alkoxy-lower alkyl, cyclopentyl, cyclohexyl, phenyl and phenyl-lower alkyl and said phenyl and phenyl-lower alkyl substituted by a member selected from the group consisting of lower alkyl, hydroxy, lower alkoxy, mercapto, lower alkylmercapto, amino, lower alkyl-amino, di-lower alkylamino, halogen, trifluoromethyl and nitro, $R_3$ represents a member selected from the group consisting of hydrogen and lower alkyl and $R_6$ represents a member selected from the group consisting of phenyl and phenyl-lower alkyl and said phenyl and phenyl-lower alkyl substituted by a member selected from the group consisting of lower alkyl, hydroxy, lower alkoxy, mercapto, lower alkylmercapto, amino, lower alkylamino, di-lower alkylamino, halogen, trifluoromethyl and nitro.

References Cited by the Examiner

Cheng et al., Jour. Org. Chem., vol. 23, 1958, pages 191–200.

Taylor et al., Jour. Amer. Chem. Soc., vol. 83, Jan. 5, 1961, pages 248–249.

NICHOLAS S. RIZZO, *Primary Examiner.*